March 26, 1929.  W. S. DAVIS  1,706,658
HOE
Filed April 15, 1927
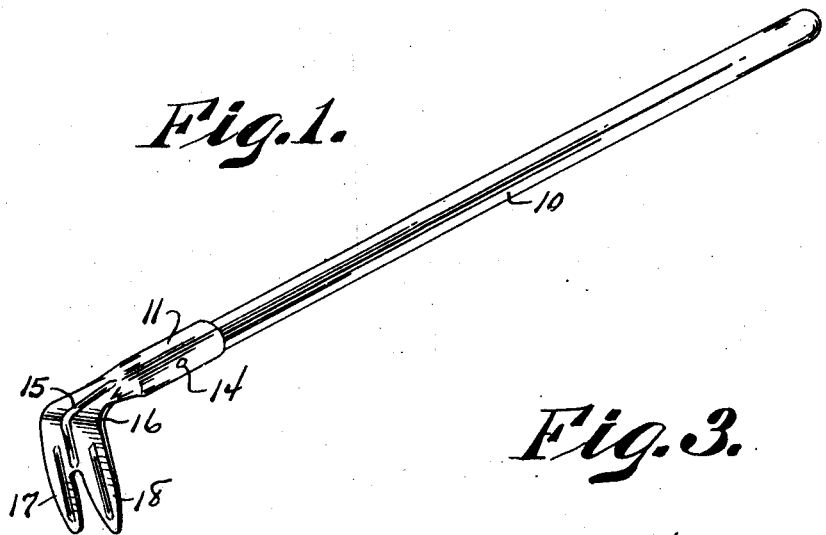
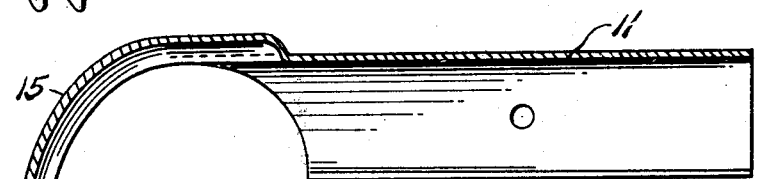
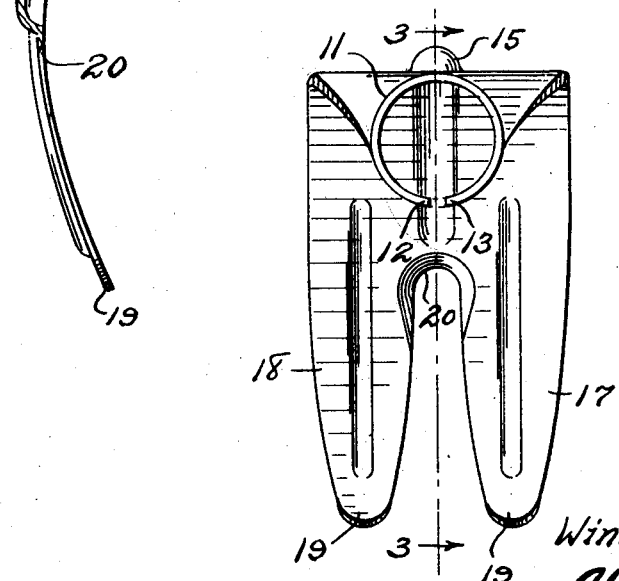
Winthrop S. Davis
INVENTOR Patented Mar. 26, 1929.

1,706,658

UNITED STATES PATENT OFFICE.

WINTHROP S. DAVIS, OF PUEBLO, COLORADO.

HOE.

Application filed April 15, 1927. Serial No. 184,162.

The object of this invention is to provide a hoe especially adapted for the purpose indicated below, and including a tubular shank portion, for the reception of a handle, and a blade curved or bent, in a particular manner, in order that it may suit, or serve to the best advantage, the objects to be specified,— the lower end of the blade being forked, and the prongs having, if desired, rounded ends which may be blunt, so that they will not cut or damage the crop being cultivated.

With the foregoing and other objects in view, the invention consists in the novel construction and arrangement of elements described, illustrated and claimed, it being understood that modifications may be made within the scope of the claim without departing from the spirit of the invention.

In the drawings forming part of this application,

Figure 1 shows the device in perspective.

Figure 2 is a view in elevation, from the inner side of the blade and shank.

Figure 3 is a view in section on the line 3—3 of Figure 2.

The handle 10 is preferably of light wood, and is somewhat shorter than an ordinary handle for a hoe, and this element 10 enters the tubular shank portion 11, which may be formed by bending over the metal, so that the approaching edges 12 and 13 will be in approximately the position of Figure 2. The handle is secured by a rivet, such as that shown at 14, and the blade of the hoe is of particular form, including the rib 15, the portion 16, and the blade per se, which is divided to form prongs or the like 17 and 18, these elements each constituting in fact a blade member.

The ends of the prongs may be curved, as shown, and are preferably blunt, as indicated at 19, so as not to cut the plants being cultivated. Between the upper portions of the prongs or elements 17 and 18, the metal may be thinned so as to form the equivalent of a U-shaped cutting portion 20, and the curve shown especially in the longitudinal section of Figure 3, between the upper portion of the blade and the prongs thereof, permits the device to be used in such manner that the operator may maintain a substantially upright position, and the weeds may be either cut, or the weeds may be extracted by producing an upward movement, thereby lifting them from the soil, for the purpose of removal, in any well known manner.

It will be noted that the tubular shank portion 11 is split, the entire metallic structure being integrally formed by pressing a blank into the shape illustrated in the drawings.

This tool is especially adapted for use around flowering plants, the individual employing it being enabled to reach far back between the flowers, and place the prongs over a weed, and either pull the latter out by the roots, or cut off the stalk, as desired. The hoe will readily loosen the soil around the flowers, and is readily handled without excessive manual effort. Moreover, the tool is especially adapted for thinning beets and other vegetables, it being understood that the article will be made in various sizes, depending upon the uses to which it is to be applied. In the rather difficult task of properly weeding and cultivating strawberry vines, the device has proved to be especially efficient, weeds being removed by an approximately vertical movement, after the prongs have been placed beneath the soil, or being cut off, when necessary, as before indicated.

The hoe has been constructed in this particular shape for the purpose of removing weeds, etc., from lawns, without cutting holes, or otherwise damaging the lawn. Being shaped as near to the human hand as possible, the tool is especially adapted for use around onion and celery plants, and in fact, will prove a favorite with all growers of garden truck, and on account of its size and weight, for use in green houses.

Having described the invention what is claimed is:—

In a hoe, a handle, a shank comprising a split tubular member for connection at one end to the handle, a blade formed with the shank portion at the other end thereof and deflected in arch form in a direction approximately at right angles to the handle, the blade being notched to form elongated prongs and being bevelled at the inner end of the notched portion, said prongs having elongated corrugations of the approximate length of the prongs, and the blade being corrugated centrally, at the arch portion, and in alinement with the axis of the handle and in a plane passing between the prongs.

In testimony whereof I affix my signature.

WINTHROP S. DAVIS.